United States Patent [19]

Katurashima et al.

[11] Patent Number: 5,233,678
[45] Date of Patent: Aug. 3, 1993

[54] OPTICAL FIBER CABLE INCLUDING PLURAL MULTIFIBER OPTICAL UNITS

[75] Inventors: Wataru Katurashima; Yoshinobu Kitayama; Hiroaki Sano; Hiroki Ishikawa; Shigeru Tanaka, all of Kanagawa, Japan

[73] Assignee: Sumitomo Electric Industries, Ltd., Osaka, Japan

[21] Appl. No.: 892,944

[22] Filed: Jun. 3, 1992

[30] Foreign Application Priority Data

Jun. 3, 1991 [JP] Japan .................. 3-130212

[51] Int. Cl.⁵ .............................................. G02B 6/44
[52] U.S. Cl. .................... 385/112; 385/100; 385/113; 385/114
[58] Field of Search ............... 385/100, 106, 107, 112, 385/113, 114, 104

[56] References Cited

U.S. PATENT DOCUMENTS

| | | | |
|---|---|---|---|
| 4,699,461 | 10/1987 | Taylor et al. | 385/112 |
| 4,820,014 | 4/1989 | Nishimura et al. | 385/106 X |
| 4,859,025 | 8/1989 | Houghton | 385/114 X |
| 4,906,067 | 3/1990 | Mayr et al. | 385/112 X |
| 4,997,257 | 3/1991 | Spedding | 385/114 |
| 5,050,960 | 9/1991 | Sutehall | 385/113 |
| 5,067,830 | 11/1991 | McAlpine et al. | 385/114 |
| 5,082,380 | 1/1992 | Sutehall et al. | 385/114 |
| 5,179,611 | 1/1993 | Umeda et al. | 385/110 |

FOREIGN PATENT DOCUMENTS

| | | | |
|---|---|---|---|
| 0216548 | 4/1987 | European Pat. Off. | 385/100 X |
| 0280279 | 8/1988 | European Pat. Off. | 385/106 X |
| 0349206 | 1/1990 | European Pat. Off. | 385/106 X |
| 63-228114 | 9/1988 | Japan | 385/107 X |

Primary Examiner—Brian Healy
Attorney, Agent, or Firm—Cushman, Darby & Cushman

[57] ABSTRACT

Provided is an optical cable using multifiber optical units. Each of said multifiber optical units has a laminated body of a tape-type optical unit accommodated in a groove formed in a rod-like member. The tape-type optical unit is constituted by a plurality of optical fibers arranged in one row and coated collectively. The improvement is that the distance between the center of the rod-like member and a bottom portion of said groove is made to be equal to or larger than one half of the height of the laminated body to thereby reduce side pressure exerted on the tape type-optical units at the groove bottom portion thereof.

8 Claims, 4 Drawing Sheets

OPTICAL FIBER CABLE INCLUDING PLURAL MULTIFIBER OPTICAL UNITS

BACKGROUND OF THE INVENTION

The present invention relates to a multifiber high-density cable which has good transmission characteristics and which is relatively inexpensive.

FIELD OF THE INVENTION

As a multifiber high-density optical cable which is being put in practice at present, the tape slot-type optical cable of Japan (Japanese Utility Model Unexamined Publication No. Sho-58-188613) is an optical cable which has a large number of optical fibers. In such a tape slot-type optical cable, the number of optical fibers reaches 1000 and the packing density of coated optical fibers per unit area is about 0.8 optical fibers per $mm^2$.

Further, since a groove for accommodating a tape-type optical unit therein has an opening portion, the tape slot-type optical cable is superior to other types of optical fiber cables because of the ease of removing the tape-type optical unit. Particularly, in an optical cable required to be waterproof, the waterproof property can be simply provided by using water-absorbing press-winding tape, as stated in "Characteristic of Simple-Waterproof Optical Fiber" (1988 Autumn Meeting of the Institute of Electronics, Information and Communication Engineers of Japan, B-376).

In Addition to tape slot-type cable, there is available tape tube-type optical cable. Tape tube-type cable is a high-fiber-count optical cable, for example, that of AT&T Corporation in the United States (International Wire & Cable Symposium Proceedings 1982, p. 396), which has an optical-fiber packing density of about 1.3 coated optical fibers per $mm^2$. The tape tube-type optical cable is thus one of the multifiber optical cables having superior high-fiber density capacity.

However, since the tape tube-type optical units are accommodated in a tube as shown in FIG. 8, the tape tube-type optical cable is not convenient for removing the tape-type optical units. There is another problem with tape tube-type optical cable, in that it is necessary to seal a gel-like waterproofing admixture into the tube in order to make the cable waterproof and therefore the utility of the optical cable is further lowered.

In the tape slot-type optical cable, the optical units are accommodated in the grooves formed in an outer circumference of a slotted rod as shown in FIGS. 5 and 6. The tape-type optical units are detrimentally pressed against the respective groove bottoms and are subjected to side pressure by the force which acts toward the center of the slotted rod.

Further, in a case of the tape slot-type optical cable having not less than 500 or not less than 1000 coated optical fibers, the volume of the central portion of the slotted rod is not utilized, thus lowering the density efficiency of the cable. As an improvement in the density efficiency, such a multi-layer structure as shown in FIG. 7 may be considered. In such a structure, however, the difficulty of removing the tape-type optical units in a central layer is substantial.

SUMMARY OF THE INVENTION

It is an object of the present invention to provide an optical cable in which the above problems are solved. In particular, objects of the present invention are to provide an optical cable in which tape-type optical units receive little side pressure in their respective grooves; in which the difficulty of removing the optical units is lowered; and in which the density efficiency is high even for many coated optical fibers.

According to the present invention, the optical cable uses multifiber optical units, each of the multifiber optical units has a lamination body of a tape-type optical unit accommodated in a groove formed in a rod-like member. The tape-type optical unit is composed of a plurality of optical fibers arranged in one row and coated collectively. The distance between the center of the rod-like member and a bottom portion of the groove is at least equal to one half of the height of the lamination body.

The multifiber optical units may be twisted in one direction or twisted so as to be reversed alternately in opposite directions. In the optical cable, strength members may be provided on an outside portion of each of the multifiber optical units.

In the optical cable according to the present invention, since the groove is formed in the circular rod-like member so as to reach the central portion as shown in FIG. 3, the density efficiency of optical fibers in the multifiber high-density optical cable having not less than 500 or not less than 1000 coated optical units is improved, and the diameter of the cable can be made smaller than that of the tape slot-type optical cable.

Further, unlike the tape slot-type optical cable, the tape-type optical unit is arranged substantially at the center of the multifiber optical unit so that the tape-type optical unit is hardly pressed against the groove bottom in the normal state. Although the tape-type optical unit may be occasionally pressed against the groove bottom, temporary bending of the optical fibers due to side pressure can be substantially reduced even when the optical unit is under pressure.

DETAILED DESCRIPTION OF THE PREFERRED EMBODIMENTS

Figure 1:
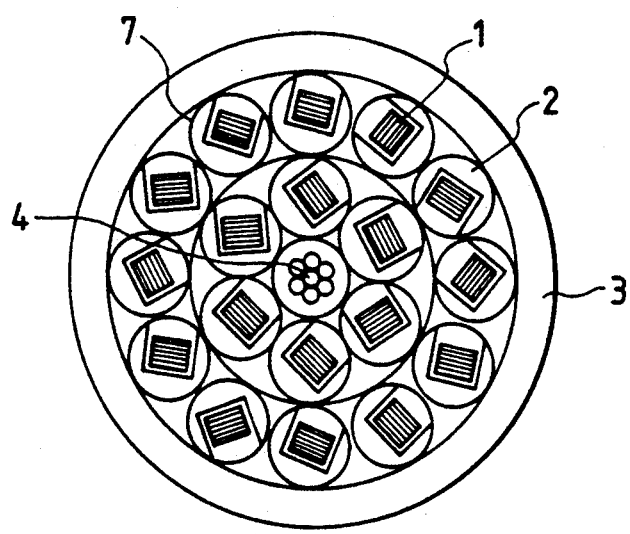
FIG. 1 is a cross-section of the optical cable according to one embodiment of the present invention.

In the optical cable shown in FIG. 1 as an embodiment of the present invention, multifiber optical units 1 were layer-twisted in one direction around a central tension body 4. Additional multifiber optical units 1 were layer-twisted in one direction on the outside of the first-mentioned twisted multifiber units 1, and then a sheath was applied thereto.

Figure 2:
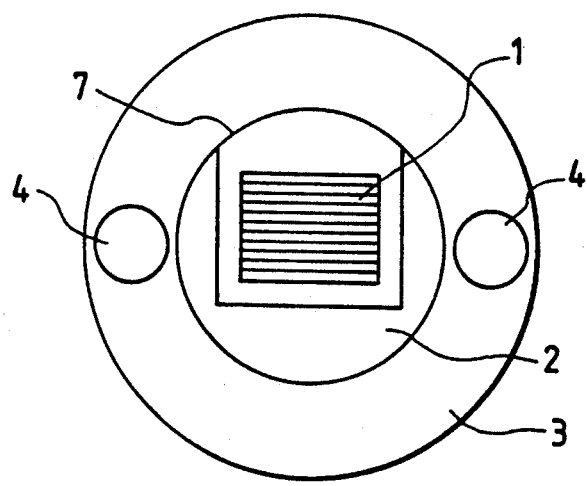
FIG. 2 is a cross-section of the optical cable according to another embodiment of the present invention.

In the optical cable shown in FIG. 2 as another embodiment of the present invention, a multifiber optical unit was arranged in the center of the optical cable. A sheath 3 was applied to the outside of the multifiber optical unit, and two members were arranged in the sheath 3 so as to be on opposite sides of the optical unit.

Figure 3:
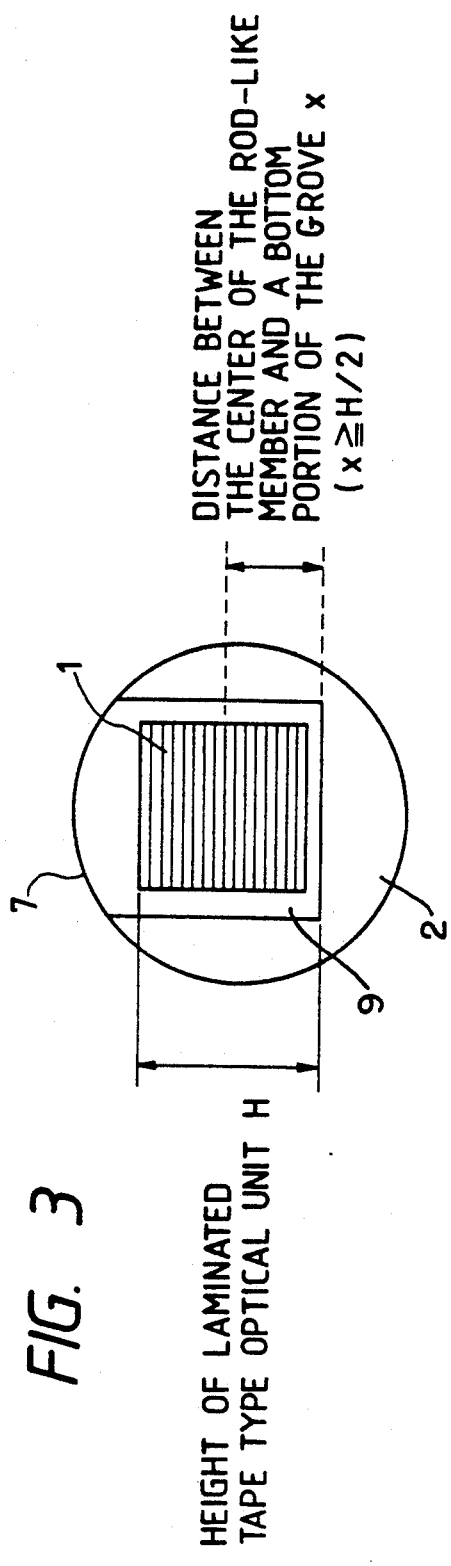
FIG. 3 is a cross-section of an embodiment of the multifiber optical unit to be used in the optical cable according to the present invention.
Figure 4:
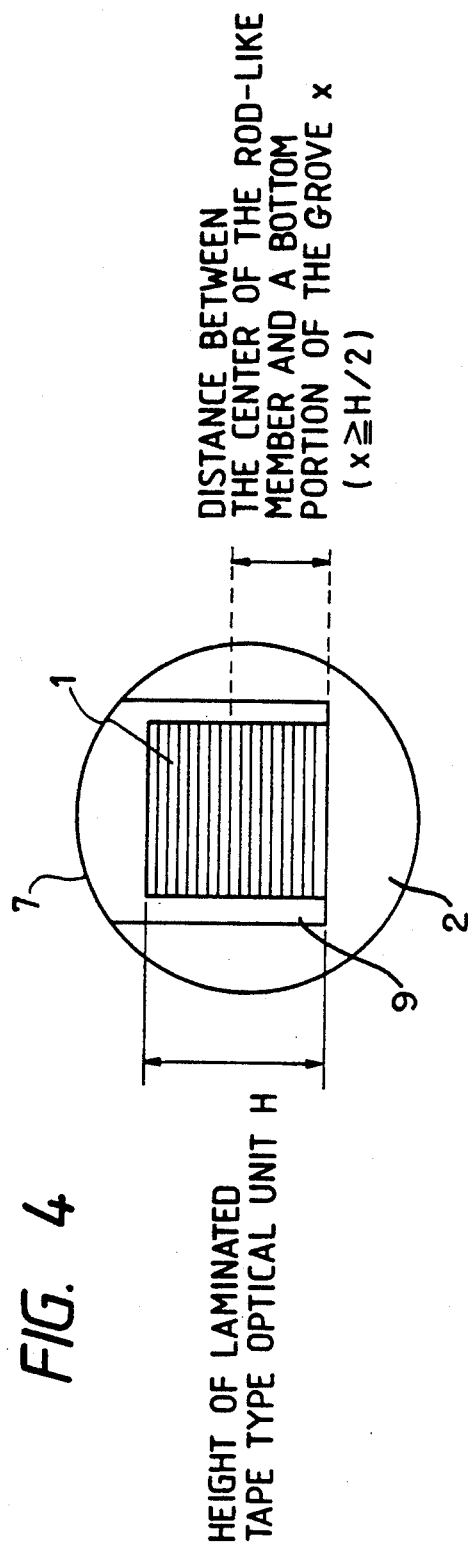
FIG. 4 is a cross-section of another embodiment of the multifiber optical unit to be used in the optical cable according to the present invention.
Figure 5:
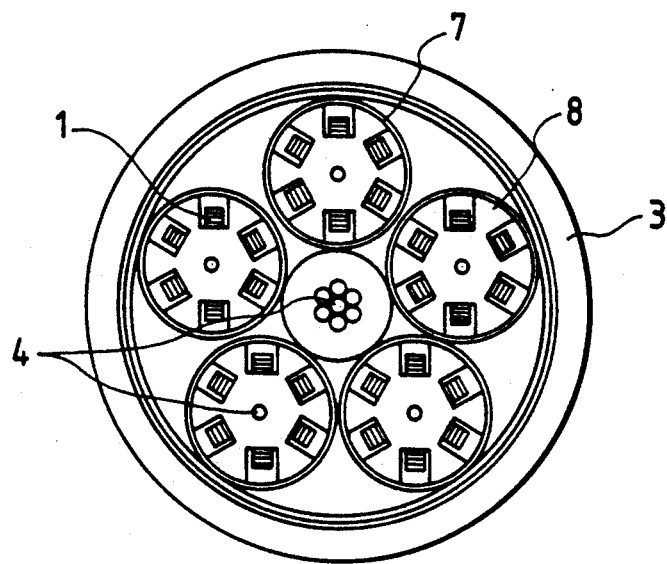
FIG. 5 is a cross-section of an example of a conventional tape slot-type optical cable.
Figure 6:
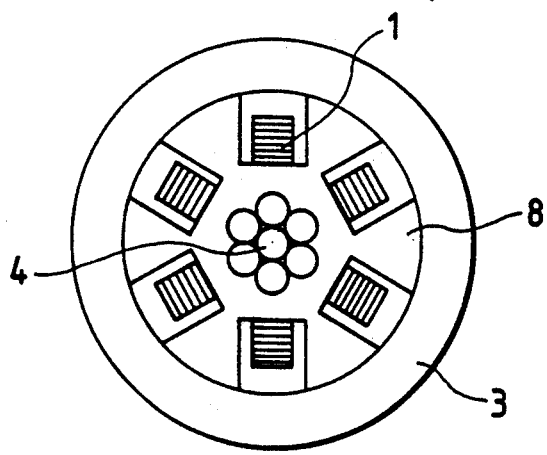
FIG. 6 is a cross-section of another example of a conventional tape slot-type optical cable.
Figure 7:
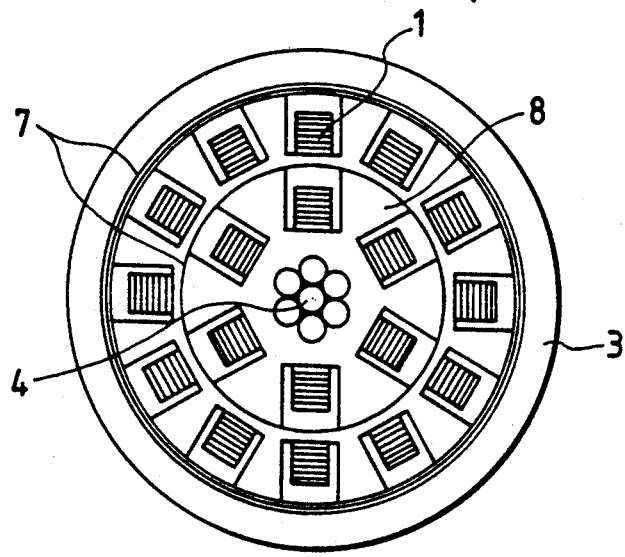
FIG. 7 is a cross-section of an example of a conventional multi-layer structure tape slot-type optical cable.
Figure 8:
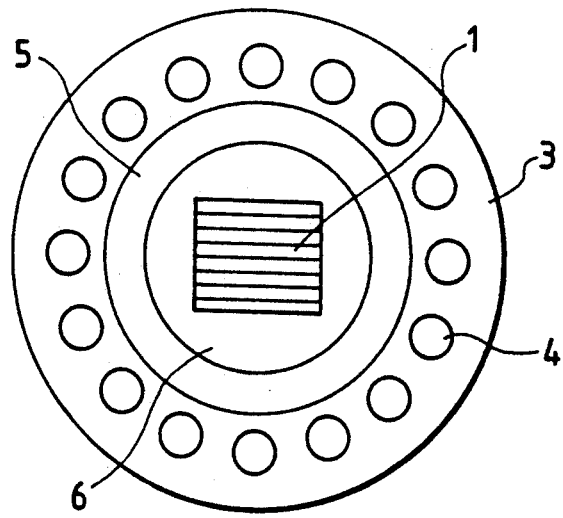
FIG. 8 is a cross-section of an example of a conventional tape tube-type optical cable.

In each of the multifiber optical units shown in FIGS. 3 and 4, a circular rod-like member 2 is made of high-density polyethylene and has a twisted rectangular groove. The material to be used for the circular rod-like member 2 may be plastic such as polypropylene or the like which has advantageous extrusion molding properties or may be a metal such as aluminum which has advantageous workability properties.

In order to improve the accommodation density of optical fibers, each coated optical fiber to be used has a small outer diameter of about 200 μm.

In the tape-type optical unit 1, 16 coated optical fibers are aligned adjacent and parallel to each other so as to be in a tape-like arrangement, and 14 tape-like arrangements are laminated on top of each other into a laminated body, and the laminated body is inserted into the rectangular groove of the circular rod-like member 2. After being inserted into the groove, the tape-type optical unit 1 is held in the groove, by means of press-winding tape 7.

The relationship between the depth of the groove and the height of the lamination body is selected so that the center of the laminated tape-type optical unit is substantially aligned with the center of the circular rod-like member so that the tape-type optical unit is not subjected to side pressure. The groove is formed in the circular rod-like member so as to reach at least the central portion as shown in FIG. 3. Further, the distance between the center of the rod-like member and a bottom portion of said groove may be made to be equal to or larger than one half of the height of the laminated body.

Ordinarily, the press-winding tape 7 may be plastic tape. Particularly, in the case where there is no waterproof property requirement, plastic may be directly extruded in a pipe-like form so as to cover the tape-type optical unit. In the case where waterproof cable is necessary, each coated optical fiber may be made to have waterproof properties, or a material having water-absorbing property may be used for the press-winding tape.

The substantially rectangular shape of the optical fiber accommodating portion formed in the circular rod-like member results in suppressing the disorder of the arrangement of the tape-type optical units and also improves the waterproof property of the cable because no excess space is purposely provided. Further, in the case where the waterproof property becomes a problem, water-absorbing press-winding tape may be used at the opening portion to thereby be useful in providing a waterproof barrier while also preventing the connection workability from being impaired.

The residual strain of the optical fibers after being assembled into a cable was selected to be not higher than 0.02% taking into consideration the long-time reliability of the optical fibers. Also, in each step in the cable manufacturing process, the tension of each of the members such as the circular rod-like member, the tape-type optical unit, the multifiber optical unit, and the tension force body, etc., were selectively adjusted.

As an example, the embodiment of the optical cable as shown in FIG. 1 becomes a super-multifiber high-density optical cable having an outer diameter of 47.2 mm. The cable contains 4032 coated optical fibers, thus having an optical fiber packing density of about 2.3 coated optical fibers per $mm^2$.

In this cable, good performance characteristics were confirmed because no increase of losses were recognized within the measurement error when the fiber optics were tested at each step of the manufacturing process with a communication-type wavelength of 1.31 μm.

As described above, the optical cable according to the present invention is superior for two reasons. First, the present invention has a multifiber high-density property, and secondly, optical fiber units are readily accessible and removable, thus increasing maintenance, repair and connection efficiency. Also, in the optical cable of the present invention, the influence of side pressure on the optical fibers is reduced thus increasing the reliability of the fiber optics.

Accordingly, it is possible to use less expensive optical fibers which are more susceptible to power losses due to side pressure, so that a relatively inexpensive optical cable can be provided. The optical cable is effectively used particularly for a multifiber optical cable such as a subscriber optical cable or the like.

While the present invention has been described above with respect to a few preferred embodiments, it should of course, be understood that the present invention should not be limited only to these embodiments but various changes or modifications may be made without departing from the scope of the invention as defined by the appended claims.

What is claimed is:

1. An optical cable having a plurality of multifiber optical units, each of said multifiber optical units comprising:
    a rod-like member having a groove therein, said groove being formed so that a bottom thereof at least reaches a center of the rod-like member; and
    a lamination body having a plurality of tape-type optical units each having a plurality of optical fibers arranged in one row, the lamination body being accommodated in the groove of the rod-like member.

2. A optical cable according to claim 1, wherein a center of the laminated body is substantially concentric with the center of said rod-like member.

3. An optical cable according to claim 1, wherein said multifiber optical units are twisted in one direction or twisted in a condition so as to be reversed alternatively in opposite directions.

4. An optical cable according to claim 1, wherein at least one strength member is provided on an outside portion of each of said multifiber optical units.

5. An optical cable according to claim 1 wherein the distance between a center of the rod-like member and a bottom of said groove is at least equal to half of a height of the lamination body.

6. An optical cable according to claim 5, wherein a center of the laminated body is substantially concentric with the center of said rod-like member.

7. An optical cable according to claim 5, wherein said multifiber optical units are twisted in one direction or twisted in a condition so as to be reversed alternatively in opposite directions.

8. An optical cable according to claim 5, wherein at least one strength member is provided on an outside portion of each of said multifiber optical units.

* * * * *